(12) United States Patent
Steindl

(10) Patent No.: US 8,623,177 B2
(45) Date of Patent: Jan. 7, 2014

(54) PROCESS FOR THE MANUFACTURE OF PAPER PRODUCTS

(76) Inventor: Roman Steindl, Zwetti (AT)

( * ) Notice: Subject to any disclaimer, the term of this patent is extended or adjusted under 35 U.S.C. 154(b) by 0 days.

(21) Appl. No.: 13/453,894

(22) Filed: Apr. 23, 2012

(65) Prior Publication Data

US 2012/0285646 A1 Nov. 15, 2012

Related U.S. Application Data

(60) Provisional application No. 61/484,543, filed on May 10, 2011.

(30) Foreign Application Priority Data

May 10, 2011 (AT) ...................................... 655/2011

(51) Int. Cl.
*D21H 17/28* (2006.01)
*D21H 23/28* (2006.01)
*D21H 23/50* (2006.01)

(52) U.S. Cl.
USPC ............ 162/175; 162/184; 162/186; 162/266

(58) Field of Classification Search
USPC .......... 162/175, 183–186, 265, 266, 308, 208
See application file for complete search history.

(56) References Cited

U.S. PATENT DOCUMENTS

| 3,461,032 | A | * | 8/1969 | Lichtenberger | ................ 162/266 |
| 3,536,580 | A | * | 10/1970 | La Fave | ......................... 162/186 |
| 3,919,042 | A | * | 11/1975 | Spiller | ........................... 162/175 |
| 5,129,989 | A | * | 7/1992 | Gosset et al. | .................. 162/147 |
| 5,792,317 | A | * | 8/1998 | Taylor et al. | ................... 162/175 |
| 7,011,729 | B2 | * | 3/2006 | Strong et al. | ................... 162/176 |
| 2004/0244927 | A1 | * | 12/2004 | Pianta et al. | ................... 162/124 |
| 2006/0005935 | A1 | * | 1/2006 | Harris et al. | ................... 162/183 |
| 2008/0236774 | A1 | | 10/2008 | Henssler et al. | |

FOREIGN PATENT DOCUMENTS

DE 2 108 658 9/1972
WO WO 2006/037750 4/2006

OTHER PUBLICATIONS

Spraying Systems Co., Plastic VeeJet® Spray Nozzle Specifications, 2000.*

* cited by examiner

*Primary Examiner* — Eric Hug
(74) *Attorney, Agent, or Firm* — Drinker Biddle & Reath LLP

(57) ABSTRACT

The invention relates to a process for the manufacture of paper, paperboard and cardboard, wherein spray starch is applied to a moving, wet sheet of material and which is characterized in that the starch is sprayed onto the wet sheet of material in powder form by means of one or more nozzle(s).

11 Claims, No Drawings

PROCESS FOR THE MANUFACTURE OF PAPER PRODUCTS

CROSS REFERENCE TO RELATED APPLICATIONS

This application claims benefit of U.S. Provisional Application No. 61/484,543, filed 10 May 2011 by Roman Steindl, for a "Process for the Manufacture of Paper Products," and of Austrian Patent Application No. 655/2011 filed 10 May 2011. Both of those applications are incorporated herein by reference in their entirety.

BACKGROUND OF THE INVENTION

The invention relates to a process for the manufacture of paper, paperboard or cardboard by applying spray starch to a moving, wet sheet of material.

When producing paper, paperboard or cardboard, in the following collectively referred to as paper products, in most cases starch is added to increase strength. Especially when using a more or less large portion of waste paper in addition to fresh pulp, the addition of starch is necessary because reprocessed recycling paper usually has a much shorter average fiber length, which would substantially affect the strength of the paper product. Generally, between 0.5 and 10 wt %, occasionally up to 15 wt %, usually between approximately 1 and 5 wt %, based on the dry weight, of starch is added to pulp suspensions.

The starch may be added as mass starch, spray starch or surface starch. Mass starches mixed with the pulp suspension already in the approach flow system of the paper machine, i.e. in the chest before the headbox; cationic and/or anionic modified starches are frequently used, which are added in the form of a powder, a suspension or, most commonly, a solution.

Spray starch is usually applied as an aqueous suspension, e.g. approx. 3%, after the headbox in the wire section. During the production of multi-layer paper products, the spray starch is often (also) sprayed between individual layers in order to increase layer strength during pasting. The spray starch thus applied penetrates into the material sheet when passing the wire section and again increases the internal strength of the paper product.

Surface starch is usually applied, i.e. rolled, onto the surface of the material sheet in the size press, i.e. in the dry section, in the form of a thin film of an aqueous starch solution. This suspension not only serves to increase the strength, but also to adjust the surface properties, especially smoothness, porosity and printability, and it may also contain a number of additives such as sizing agents, pigments, dyes and optical brighteners.

Of course, the necessity of adding starch considerably reduces part of the economic benefit of using recycling paper or fibers. Due to the fact that starch is a natural polymer with a predetermined grain size distribution, a large portion of the hydrated spray starch grains of the suspension pass the material sheet in the wire section and is withdrawn together with the water. Without an at least rough mechanical separation before the downstream sewage treatment plant, preferably by recovering the starch from the waste water, this spray starch portion represents an additional burden to the sewage treatment plant.

Before this background, the object of the invention was to provide an improved process for the manufacture of a paper product, by which process the above-mentioned disadvantages may be at least partly eliminated.

In the course of his research, the inventor of the present subject matter found out that spray starch may also be applied to the wet sheet of material in solid, i.e. powder, form. The application of solid spray starch is mentioned in DE 2,108,658 A merely in one single sub-claim (but not in the description) and is only implicitly suggested in the WO 2006/037750 A1 and its priority application, DE 10 2004 048 430 A1. Detailed procedures or advantages of using solid spray starch are not disclosed in any of these applications.

DISCLOSURE OF THE INVENTION

For the first time, the invention now provides a process for the manufacture of paper, paperboard or cardboard in which spray starch is applied to a moving, wet sheet of material and which is characterized in that the starch is sprayed onto the wet sheet of material in the form of a powder by means of one or more nozzle(s).

This process is based on the research results of the inventor who found out that simply scattering dry starch over the material sheet is possible but not useful. Since modem paper machines transport the pulp sheets with up to 2,000 m/min, i.e. 120 km/h, the material sheet carries along an air layer on its surface. Dry starch has to pass this "air cushion" in order to be able to penetrate into the wet sheet. If starch powder is simply sprinkled onto the sheet, a large portion does not even reach the sheet surface but rebounds from the air layer, gets distributed in the ambient air and finally either settles down on the ground next to the paper machine or is aspirated by a ventilation system.

A possible partial solution for this problem would be to provide a powder distributor for the dry starch directly above the material sheet, e.g. at a distance of (much) less than 1 cm. Thus, the air layer would break at the powder distributor, so that a larger portion of dry starch would reach the sheet surface. However, due to the air turbulences in this area, a relatively large portion of starch would still get lost. Furthermore, uneven regions in the material sheet would bring along the risk of the pulp sheet scraping at the powder distributor, which, in the worst case, would cause the sheet to tear. Therefore, such a procedure is not preferred according to the present invention.

By means of the inventive spraying of dry starch through one or more nozzle(s), which, for the sake of simplicity, is simply referred to as "nozzle-spraying" in the following, starch transported in a carrier air stream is able to penetrate the air cushion above the material sheet and thus reaches the sheet surface or is fixed therein, respectively. In the following, sometimes only one nozzle might be mentioned, but it is to be understood that this also includes the plural, e.g. one or more sets of nozzles.

A further advantage of the inventive process is that the nozzle-sprayed solid starch requires a certain time to be wetted, hydrated and suspended or dissolved by the water in the material sheet. By appropriately selecting the parameters of the inventive procedure, e.g. nozzle pressure type and grain size of the starch, water content and transport velocity of the material sheet, suction pressure in the wire section, etc., the starch passing the wire section does not have enough time to completely penetrate the material sheet. Thus, there is substantially no spray starch withdrawn together with the water in the wire section.

Given commonly used further parameters, it has proven advantageous to spray the starch onto the material sheet using air as a carrier gas at a rate of at least 0.5 m/s, preferably at least 1 m/s, which herein refers to the exit velocity from the nozzle. A lower exit velocity might in some cases be too low to allow all nozzle-sprayed starch to permeate the air cushion.

Very high velocities, such as more than 2 or 3 m/s, may on the one hand require an uneconomically high nozzle pressure, and could on the other hand cause the starch to be pressed too deep into the sheet or even through it ("shot through"), so that it might in the end penetrate the entire material sheet in the wire section.

Therefore, according to current findings of the inventor, a preferred range for the exit velocity is 0.5 to 3 m/s, more preferably 0.75 to 2.5 m/s, even more preferably 1 to 2 m/s, especially 1 to 1.5 m/s.

The distance of the nozzle(s) from the surface of the material sheet is not particularly limited and mainly depends on the nozzle exit velocity and the transport velocity of the material sheet. For the above preferred starch particle velocities between 0.5 and 3 m/s at the nozzle exit, combinations of nozzle distances of between 5 and 80 cm, preferably between 10 and 50 cm, have shown to be advantageous. With a distance too large, the nozzle exit velocity would have to be increased in order to permeate the air cushion, which would be uneconomical, and with a distance too small, the surface integrity of the material sheet could be affected by the air jet in the wire section.

The spray pattern that is achieved with the nozzle(s), i.e. the distribution pattern of the starch grains supplied by the nozzle(s) on the surface of the material sheet, is also to be taken into account. In order to achieve sufficient effects over the entire pulp sheet, the spray patterns of several nozzles should overlap. If the distance between the nozzles and the sheet is too short, the number of nozzles required will be too high, which would increase the apparatus expenses.

Furthermore, if the distance is very short, similar problems as mentioned above with regard to a powder distributor may arise. For predetermined operation, parameters of a particular paper machine, the respectively optimum combination of nozzle number, nozzle exit velocity and nozzle distance can be easily determined by the average artisan without undue experimentation.

In particularly preferred embodiments of the invention, nozzle-spraying is conducted against the transport direction of the material sheet, i.e. so that the average spray direction forms an acute angle with the transport direction of the sheet, preferably an angle between 30° and 60°. This means that the spray starch is sprayed obliquely from above onto the material sheet approaching the nozzle station. Thus, the relative velocity between the air cushion and the starch particles impinging thereon is increased, which facilitates the permeation of the air cushion and further reduces the portion of spray starch not applied onto the sheet. In this way, the dry spray starch may also be nozzle-sprayed with a lower carrier gas pressure.

For achieving a particular distribution pattern on the material sheet, in some cases in which several nozzles are used, it may be advantageous to set the nozzles to different spray angles. This also includes cases in which certain nozzles are directed not against but with the travel direction of the material sheet.

While the type of the nozzle-sprayed starch is not particularly limited, in preferred embodiments of the invention the spray starch used for nozzle-spraying is a powder of cold soluble starch, i.e. starch having a grain size distribution and surface characteristics such that it is (colloidally) dissolved in the wet material sheet while passing the wire section. This ensures that the starch efficiently acts as a binder for the other components of the pulp sheet—even as early as in the wire section because starch develops this effect immediately when a solution is formed.

Whether cold soluble starch is used or not, strongly depends on the type of the press section used. When using certain press felts, cold soluble starch may sometimes not be preferred because the pasting process starting as early as in the wire section may cause the starch to at least partially stick to the press felt or the press roll.

In further preferred embodiments, the starch is electrostatically charged before impinging on the material sheet. Thus, the dry starch is attracted by the usually grounded pulp sheet, which may further reduce the already small portion of starch powder being lost to the surroundings.

The method for electrostatically charging the starch is not particularly limited. For example, it may be electrostatically charged before being supplied to the nozzle, before entering the nozzle, or after exiting the nozzle, e.g. by passing an electric field generated by means of ionizing electrodes or by means of friction in the feed pipe leading to the nozzle. In some embodiments, the starch may also be electrostatically charged within the nozzle by providing ionizing electrodes in the nozzle, e.g. at the nozzle end.

The grain size of the starch is not particularly limited, either, and mainly depends on the origin of the starch, e.g. whether it is corn, wheat or potato starch, as they are commonly used in Europe, or tapioca or rice starch, which are most easily available in Asia. Preferably, the starch according to the present invention has an average grain size of at least 5 μm in order to allow for calculated nozzle-spraying without any considerable loss and to simultaneously achieve optimum binding effects. If the average grain size is too small, the particles may be too lightweight to permeate the air cushion. If the average grain size is too big, e.g. more than 300 or even more than 500 μm, a predetermined dosage might not provide a sufficient number of starch particles to achieve the desired distribution on the sheet surface so that the amount of nozzle-sprayed starch would have to be increased, which might be uneconomical.

The amount of starch nozzle-sprayed according to the inventive process is basically not limited and depends, among other things, on whether the spray starch is applied in addition to or instead of mass starch and/or surface starch. Preferably, the spray starch according to the present invention is applied in an amount of 0.1 to 20 wt %, preferably 0.2 to 10 wt %, based on the dry matter of the material sheet. Most preferably, the starch nozzle-sprayed according to the inventive process replaces substantially all the mass starch and surface starch, which simplifies the entire paper production process and makes it more economical.

In the inventive process, the powder spray starch may either be nozzle-sprayed alone or in combination with other solid components, especially together with powder additives such as sizing agents, pigments, dyes, or the like, which eliminates separate admixing or application steps for these components.

In the following, the invention is described by means of specific embodiments which are given merely to illustrate the invention and should not be considered as a limitation.

EXAMPLES

On a long-mesh paper machine running with moderate speed, one-layered paper having a target basis weight of 170 g/m$^2$ was produced from a pure pulp mixture consisting of softwood, *eucalyptus* sulfate and coniferous sulfite with the addition of cationic mass starch, a filler, a sizing agent and a wet strength agent. In a comparative example, no additional spray starch was used, while in the example of the invention a commercial, powdery, granular, acid-modified corn starch in an amount of 3-4 g/m² was additionally applied by means of an inventive spray nozzle device with a spray nozzle distance of 15 cm and a nozzle exit velocity of 1.5 m/s.

From the paper sheets produced, test specimens were taken from different areas of the sheet and analyzed for their paper properties. The average values obtained in typical paper analysis methods are compared in the following table.

| Paper property | Unit | Comparative Example | Example |
|---|---|---|---|
| Basis weight | [g/m²] | 168 | 171 |
| Thickness | [mm] | 0.25 | 0.25 |
| Tensile strength, dry | lengthwise [m] | 5,216 | 6,070 |
|  | crosswise [m] | 2,459 | 2,750 |
| Breaking strain | lengthwise [N/15 mm] | 132.9 | 154.2 |
|  | crosswise [N/15 mm] | 61.4 | 70.1 |
| Wax Pik | Dennison | 12 | 13 |
| Bursting pressure | absolute [N/cm²] | 42.6 | 55.5 |

The comparison clearly shows an improvement of the strength values due to the effect of the present invention. In addition to a substantial increase of the tensile strengths and breaking strains, the strong rise in the bursting pressure by more than 30% of the initial value is especially noticeable.

Consequently, the present invention provides a process which results in paper products having considerably improved properties.

The invention claimed is:

1. A process for the manufacture of paper, paperboard or cardboard, wherein spray starch is applied to a moving, wet sheet of material, wherein the starch is sprayed onto the wet sheet of material in dry powder form by means of one or more nozzle(s) using air as a carrier gas at a rate of 0.5 to 3 m/s.

2. The process according to claim 1, wherein the starch is sprayed onto the material sheet using air as a carrier gas at a rate of at least 1.0 m/s.

3. The process according to claim 1, wherein the starch is sprayed onto the sheet of material, which approaches the nozzle(s), in an acute angle from above.

4. The process according to claim 1, wherein an angle between an average spray direction and a transport direction of the sheet of material lies within a range of 30° to 60°.

5. The process according to claim 1, wherein the starch sprayed on is cold soluble starch.

6. The process according to claim 1, wherein the starch is electrostatically charged.

7. The process according to claim 6, wherein the starch is electrostatically charged before being supplied to the nozzle(s).

8. The process according to claim 6, wherein the starch is electrostatically charged within the nozzle(s).

9. The process according to claim 1, wherein the starch has an average grain size of at least 5 µm.

10. The process according to claim 1, wherein the starch is sprayed on in a proportion of 0.1 to 20 wt %, based on the dry matter of the material sheet.

11. The process according to claim 1, wherein the starch is sprayed on in a proportion of 0.2 to 10 wt %, based on the dry matter of the material sheet.

* * * * *

UNITED STATES PATENT AND TRADEMARK OFFICE
CERTIFICATE OF CORRECTION

PATENT NO.       : 8,623,177 B2
APPLICATION NO.  : 13/453894
DATED            : January 7, 2014
INVENTOR(S)      : Roman Steindl It is certified that error appears in the above-identified patent and that said Letters Patent is hereby corrected as shown below:

On the title page item (76), "Zwetti (AT)" should read "Zwettl (AT)"

Signed and Sealed this
Twenty-ninth Day of April, 2014

Michelle K. Lee
*Deputy Director of the United States Patent and Trademark Office*